United States Patent
Endo et al.

(10) Patent No.: US 8,280,316 B2
(45) Date of Patent: Oct. 2, 2012

(54) WIRELESS TRANSMITTING/RECEIVING DEVICE

(75) Inventors: Yoichi Endo, Kawasaki (JP); Hideyuki Kannari, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 51 days.

(21) Appl. No.: 12/697,986

(22) Filed: Feb. 1, 2010

(65) Prior Publication Data
US 2010/0159851 A1 Jun. 24, 2010

Related U.S. Application Data

(63) Continuation of application No. PCT/JP2007/065180, filed on Aug. 2, 2007.

(51) Int. Cl.
*H04B 1/44* (2006.01)
*H04B 1/46* (2006.01)

(52) U.S. Cl. ............... 455/78; 455/79; 455/80; 455/81; 455/82; 455/83

(58) Field of Classification Search .............. 455/78, 455/79, 80, 81, 82, 83
See application file for complete search history.

(56) References Cited

U.S. PATENT DOCUMENTS

| | | | |
|---|---|---|---|
| 5,715,527 A * | 2/1998 | Horii et al. ............... | 455/126 |
| 6,236,840 B1 | 5/2001 | Aihara et al. | |
| 6,289,216 B1 * | 9/2001 | Koh et al. ............... | 455/424 |
| 6,952,565 B1 | 10/2005 | Takeda et al. | |
| 7,212,789 B2 * | 5/2007 | Kuffner ............... | 455/83 |
| 7,379,714 B2 * | 5/2008 | Haque et al. ............... | 455/107 |
| 2002/0032009 A1 * | 3/2002 | Otaka et al. ............... | 455/83 |
| 2004/0121742 A1 * | 6/2004 | Abrams et al. ............... | 455/115.1 |
| 2004/0137854 A1 * | 7/2004 | Ge ............... | 455/78 |
| 2005/0107080 A1 | 5/2005 | Hasegawa et al. | |
| 2006/0035600 A1 * | 2/2006 | Lee et al. ............... | 455/78 |
| 2007/0066224 A1 * | 3/2007 | d'Hont et al. ............... | 455/41.2 |

FOREIGN PATENT DOCUMENTS

| | | |
|---|---|---|
| JP | 08097733 | 4/1996 |
| JP | 10-173547 | 6/1998 |
| JP | 10173547 | 6/1998 |
| JP | 10224314 | 8/1998 |
| JP | 11-122132 | 4/1999 |
| JP | 11122132 | 4/1999 |
| JP | 2001-16044 | 1/2001 |

(Continued)

OTHER PUBLICATIONS

International Search Report dated Nov. 13, 2007, from the corresponding International Application No. PCT/JP2007/065180. Notification of Reason for Refusal dated Jun. 1, 2010, from the corresponding Japanese Application No. 2009-525253.

*Primary Examiner* — Wen Huang
(74) *Attorney, Agent, or Firm* — Murphy & King, P.C.

(57) ABSTRACT

In a wireless transmitting/receiving device of TDD system etc., a transmission signal is detected on the transmitting side in a specified transmission period, a signal reflected from an antenna through a circulator is detected on the receiving side in the transmission period and a reception signal is detected on the receiving side in a specified reception period. In this case, in a part of the transmission period a transmission signal having been detected on the transmitting side is selected while in the remaining part of the transmission period a reflection signal having been detected on the receiving side through a circulator from an antenna is selected, and in the reception period a reception signal having been detected on the receiving side through the circulator from the antenna is selected and outputted.

10 Claims, 8 Drawing Sheets

FOREIGN PATENT DOCUMENTS

| | | |
|---|---|---|
| JP | 2001016044 | 1/2001 |
| JP | 2002-164832 | 6/2002 |
| JP | 2002164832 | 6/2002 |
| JP | 2005151189 | 6/2005 |
| JP | 2006093990 | 4/2006 |
| WO | 0128113 | 4/2001 |

\* cited by examiner

FIG.3B TDD SWITCHING SIGNAL $S_{TDD}$ (TDD SWITCHING MODE)

FIG.3C SWITCHING TERMINAL (POWER INFO.)

WIRELESS TRANSMITTING/RECEIVING DEVICE

CROSS-REFERENCE TO RELATED APPLICATION

This application is a continuation of International Application PCT/JP2007/65180 filed on Aug. 2, 2007, the contents of which are herein wholly incorporated by reference.

FIELD

The present invention relates to a wireless (radio) transmitting/receiving device (wireless duplexer) for preferably performing Time Division Duplexed (TDD) transmission and reception.

BACKGROUND

Along with a recent spread of mobile telephones, the service area has been developed based on a cellular communication system as a basic infrastructure for mobile networks, in which it is demanded to mount thereon a function taking into account a convenience for maintenance as the number of device or equipment adopted is increased. Also in a wireless device, the mounting demand regarding the detection of a Voltage Standing Wave Ratio (VSWR) in addition to a transmission signal level (Lt) and a reception power is being generalized.

Figure 8:
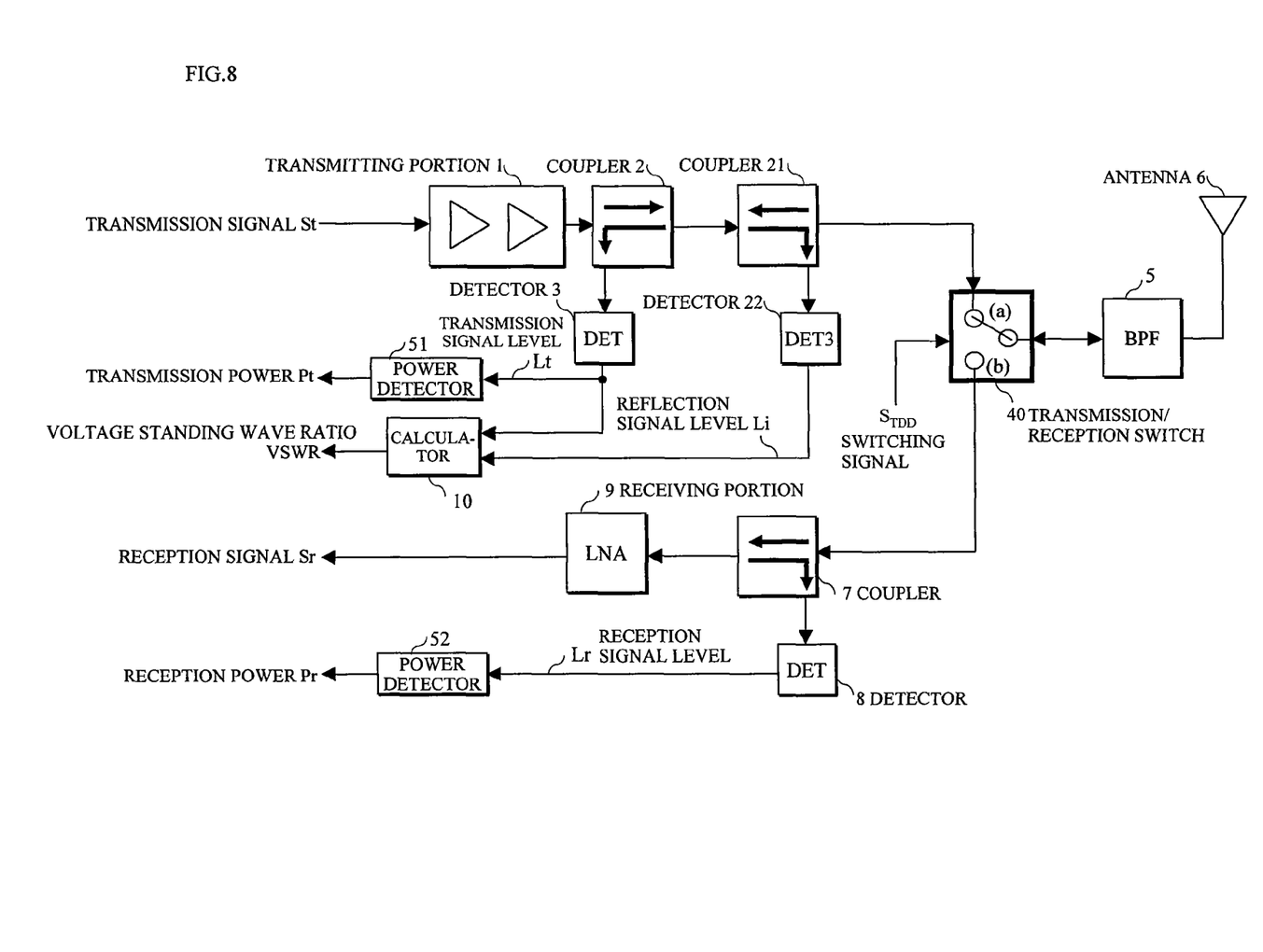
FIG. 8 is a block diagram depicting an arrangement of a wireless transmitting/receiving device of a related art.

An arrangement of a related art wireless transmitting/receiving device is depicted in FIG. 8. In this wireless transmitting/receiving device, a transmitting side circuit is composed of a transmitting portion 1 and directional couplers 2, 21 and a receiving side circuit is composed of a directional coupler 7 and a receiving portion 9, where both of the circuits are adapted to be switched over between connections with a bandpass filter (BPF) 5 and an antenna 6 by a transmission/reception switch 40 under the control of a TDD switching signal $S_{TDD}$.

At first, in a transmission period (duration) prescribed by the TDD method the transmission/reception switch 40 is switched over to a transmitting side terminal (a) as depicted, by the TDD switching signal $S_{TDD}$, at which time the output of the transmitting portion 1 having received a transmission signal St toward the antenna 6 is detected in the form of a transmission signal level (transmission voltage) Lt by a detector (DET) 3 through the coupler 2. Together with this, a reflecting signal level (reflection voltage) Li of the transmission signal St reflected by the antenna 6 is detected by a detector 22 through a coupler 21.

Voltage Standing Wave Ratio (VSWR) is expressed by a function of a ratio between a traveling wave (transmission signal level Lt) and a reflection wave (reflection signal level Li), so that with these two detection values Pt and Pi a calculator 10 can calculate the voltage standing wave ratio (VSWR).

Also the transmission/reception switch 40 is switched over to a receiving side terminal (b) by the TDD switching signal $S_{TDD}$, at which time a reception signal level (reception voltage) Lr is detected by a detector 8 through a coupler 7, where a reception signal Sr is obtained from the receiving portion (LAN: Low Noise Amplifier) 9.

The transmission signal level Lt and the reception signal level Lr are, as depicted, converted to the transmission power Pt and the reception power Pr respectively by a power detectors 51 and 52, which will be similarly applied to the following descriptions.

On the other hand, there is an impedance matching device comprising a standing wave ratio detection section measuring voltages of each of plural positions on a transmission line from a transmission section leading to an antenna to detect a standing wave ratio, an impedance calculation section recognizing a current impedance toward the antenna when viewed from the transmission line based on the standing waves on the transmission line, a setting matching table storing a setting value of a prescribed matching element as a list for the matching of the impedance between the transmission section and the impedance of the antenna, a variable matching section provided for impedance adjustment to an input terminal of the antenna receiving transmission power from the transmission line, and an arithmetic control section controlling the impedance of the matching element of the variable matching section to be a prescribed impedance based on the current impedance and an impedance from the setting matching table (See e.g. Japanese Laid-open Patent Publication No. 08-97733).

Also, there is a radio base station testing method and tester in which RF-SWs switch routes of signals transmitted/received to/from a terminal function unit attached to a base station 100; RF-SWs connect the terminal function unit to desired radio analog units; a test function controller controls switchings of the RF-SWs according to information designated by a maintenance apparatus (OMC); a base station controller controls one or a plurality of tests according to received test class information among (1) an antenna trouble test for obtaining the voltage standing wave ratio based on the transmission power of the terminal function unit, (2) a receiver trouble test for obtaining the receiver sensitivity based on the transmission power of the terminal function unit after adjusting the packet error rate, and (3) a transmitter trouble test for obtaining transmission power from the radio analog units based on the reception power value of the terminal function unit (See e.g. Japanese Laid-open Patent Publication No. 2005-151189).

Thus in the related art depicted in FIG. 8, two pairs of a directional coupler and a detector are mounted on the transmitting side circuit to detect the transmission signal level Lt and the reflection signal level Li, thereby detecting the VSWR while a single pair of a directional coupler and a detector is mounted on the receiving side circuit to detect the reception signal level Lr.

However, such a related art wireless transmitting/receiving device requires three pairs of a coupler and a detector for detecting the transmission signal level Lt, the VSWR and the reception signal level Lr. Furthermore, in case of the TDD method, the transmission period and the reception period are separated on a time axis, so that in the transmission period the receiving side circuit takes a pause while in the reception period the transmitting side circuit takes a pause, resulting in a very low circuit operation rate.

SUMMARY

According to an aspect of the invention, a wireless transmitting/receiving device includes a coupler to provide a transmission signal to an antenna side and to provide a signal from the antenna side to a receiving side; and a detecting portion to detect a level of a reflection signal of the transmission signal received through the coupler from the antenna side in a transmission period of the transmission signal and to detect a level of a reception signal from the antenna side through the coupler in a reception period.

The above wireless transmitting/receiving device may further include a second detecting portion to detect a level of the transmission signal before inputted to the coupler.

The above detecting portion may detect the level of the reflection signal in one part of the transmission period and detect a level of the transmission signal in another part of the transmission period.

The above coupler may include a circulator.

According to another aspect of the invention, a wireless transmitting/receiving device includes a first selecting portion to select a transmission signal to an antenna and a reception signal from the antenna; a detecting portion to detect a reflection signal of the transmission signal on a transmitting side in a transmission period; and a second selecting portion to select the transmission signal in the transmission period and to select a reception signal detected on a receiving side in a reception period.

This wireless transmitting/receiving device may further include a calculator to calculate a standing wave ratio from the transmission signal and the reflection signal.

In the above wireless transmitting/receiving device, a part of the transmission period may include a part of one transmission period and the remaining part of the transmission period may include the remaining part of the one transmission period. Alternatively, a part of the transmission period may include a part of overall transmission periods and the remaining part of the transmission period may include the remaining part of the overall transmission periods.

It is to be noted that the first selecting portion may include a transmitting/receiving switch, the detecting portion may include a coupler and a detector and the second selecting portion may include a two-point switch and a feedback AGC circuit.

Also, the above wireless transmitting/receiving device may further include a selector selecting the transmission signal and the reception signal from the first selecting portion respectively in the transmission period and the reception period.

The object and advantages of the embodiment will be realized and attained by means of the elements and combinations particularly pointed out in the claims.

It is to be understood that both the foregoing general description and the following detailed description are exemplary and explanatory and are not restrictive of the invention as claimed.

DESCRIPTION OF EMBODIMENTS

Embodiment [1]

FIG. 1

Figure 1A:
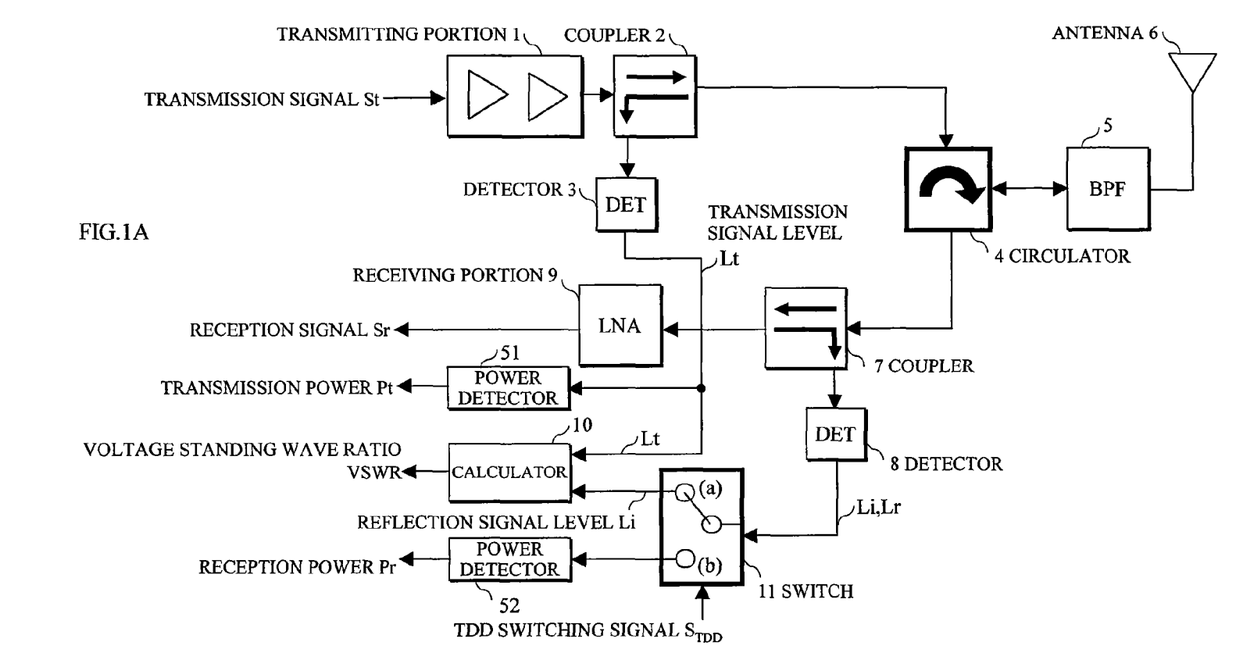
FIG. 1 is a diagram depicting an arrangement and a timing chart of an embodiment [1] of a wireless transmitting/receiving device.

FIG. 1A depicts an embodiment [1] of the present invention. In this embodiment, a circulator 4 is substituted for the transmission/reception switch 40 in the related art depicted in FIG. 8, and in the transmitting side circuit the coupler 2 and the detector 3 are used for detecting the transmission signal level Lt. In order to provide the reflection signal level Li to the calculator 10 by using the coupler 7 and the detector 8, a switch 11 capable of switching over between the reflection signal level Li and the reception signal level Lr by the TDD switching signal $S_{TDD}$ synchronized with a TDD switching mode as depicted in FIG. 1B is used.

Figure 1B:
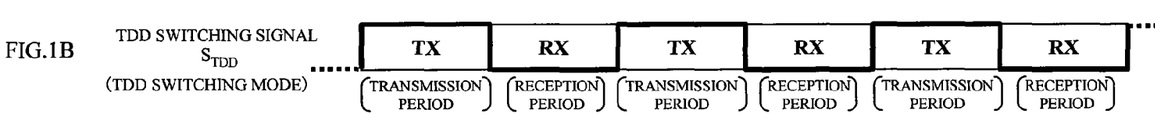
Figure 1C:
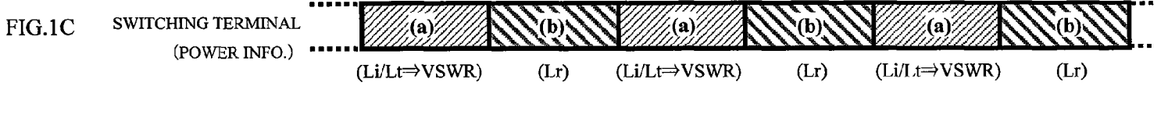

When the TDD switching mode presents a transmission period TX as depicted in FIG. 1B, for detecting the transmission signal level Lt the TDD switching signal $S_{TDD}$ switches the switch 11 over to a terminal (a) on the side of the calculator 10 (FIG. 1C-(a)). In this transmission period, the transmission signal level Lt is detected by the coupler 2 and the detector 3.

In the presence of the circulator 4 during this transmission period, the reflection signal level Li is given to the switch 11 by the coupler 7 and the detector 8 on the receiving side through the bandpass filter 5 and the circulator 4 from the antenna 6. The switch 11 is switched over to the side of the terminal (a) by the TDD switching signal $S_{TDD}$ as depicted in FIG. 1C-(b), so that the reflection signal level Li is given to the calculator 10 from the switch 11. Therefore, with the ratio of both, the calculator 10 calculates the VSWR.

On the other hand, in a reception period RX the switch 11 is switched over to the side of a terminal (b) (FIG. 1C-(b)) opposite to the position depicted by the TDD switching signal $S_{TDD}$, so that the reception signal level Lr is now detected also by the coupler 7 and the detector 8.

Therefore, in this embodiment, the coupler 7 and the detector 8 are used for the detection of the reflection signal level in the transmission period and used for the detection of the reception power in the reception period, thereby enabling the operation rate of the detection circuit to be enhanced and the detection of the transmission signal level Lt, the VSWR and the reception signal level Lr to be realized with two pairs of a coupler and a detector.

It is to be noted that although in the above Japanese Laid-open Patent Publication No. 2005-151189 a circulator is used for the detection of VSWR, the circulator in this Publication merely serves to couple a reflection wave, so that a reception wave is mixed in the coupling path, increasing the VSWR, which appears to be a fault state. According to in this embodiment, however, the receiving side circuit is used for the reflection wave measuring circuit exclusively used for the detection of the VSWR in the above Japanese Laid-open Patent Publication No. 2005-151189, thereby simplifying the circuit arrangement.

Embodiment [2]

Figure 2A:
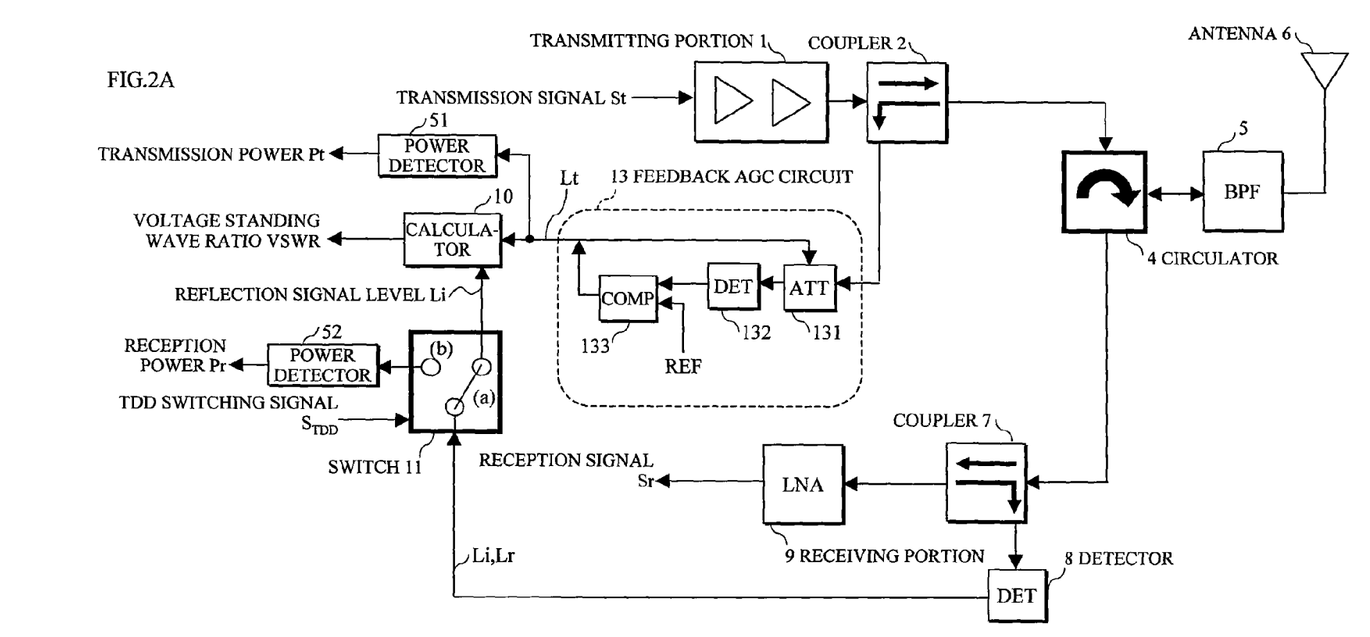
FIG. 2 is a diagram depicting an arrangement and a timing chart of an embodiment [2] of a wireless transmitting/receiving device.
Figure 2B:
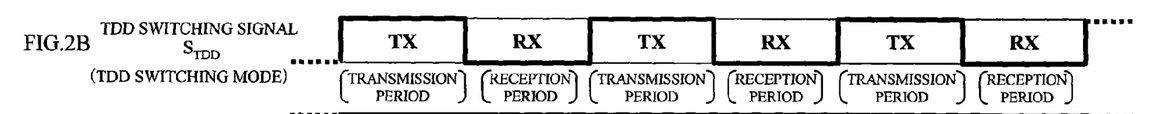
Figure 2C:
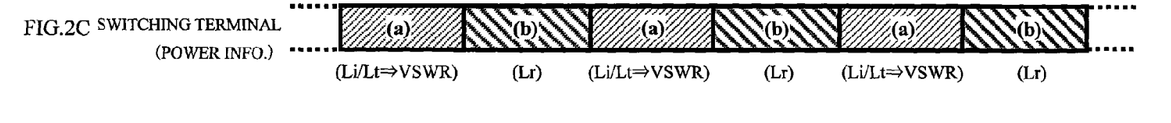

FIG. 2

This embodiment [2] depicted in FIG. 2 is different from the above embodiment [1] in that the detector 3 is replaced by a feedback AGC circuit 13 performing a feedback type distortion compensation including a detector.

The feedback AGC circuit 13 performs an optimized distortion compensation with a closed loop control composed of a variable attenuator (ATT) 131, a detector 132 and a comparator (COMP) 133, where the transmission power coupled by the coupler in the transmitting side circuit is attenuated (distortion compensated) by the variable attenuator 131 and then detected by the detector 132, the detected value being compared with a reference voltage (control voltage) REF at the comparator 133 of which output feedback controls the variable attenuator 131, thereby performing the feedback type distortion compensation to the transmission signal level Lt. As a result, the output of the detector 132 and the reference voltage REF are to have a certain mutual relationship (e.g. consistency), so that the transmission signal level Lt is provided to the calculator 10 in such a form where an input variation of the detector 132 is suppressed.

The other operations are the same as the above embodiment [1].

Therefore in this embodiment as well, the coupler 7 and the detector 8 are allocated for the detection of the reflection power in the transmission period TX while allocated for the detection of the reception signal level Lr in the reception period RX, thereby enhancing the operation rate of the detection circuit, so that the detection of the transmission signal level Lt, the VSWR and the reception signal level Lr can be achieved by two pairs of a coupler and a detector.

Embodiment [3]

Figures 3A, 3B:
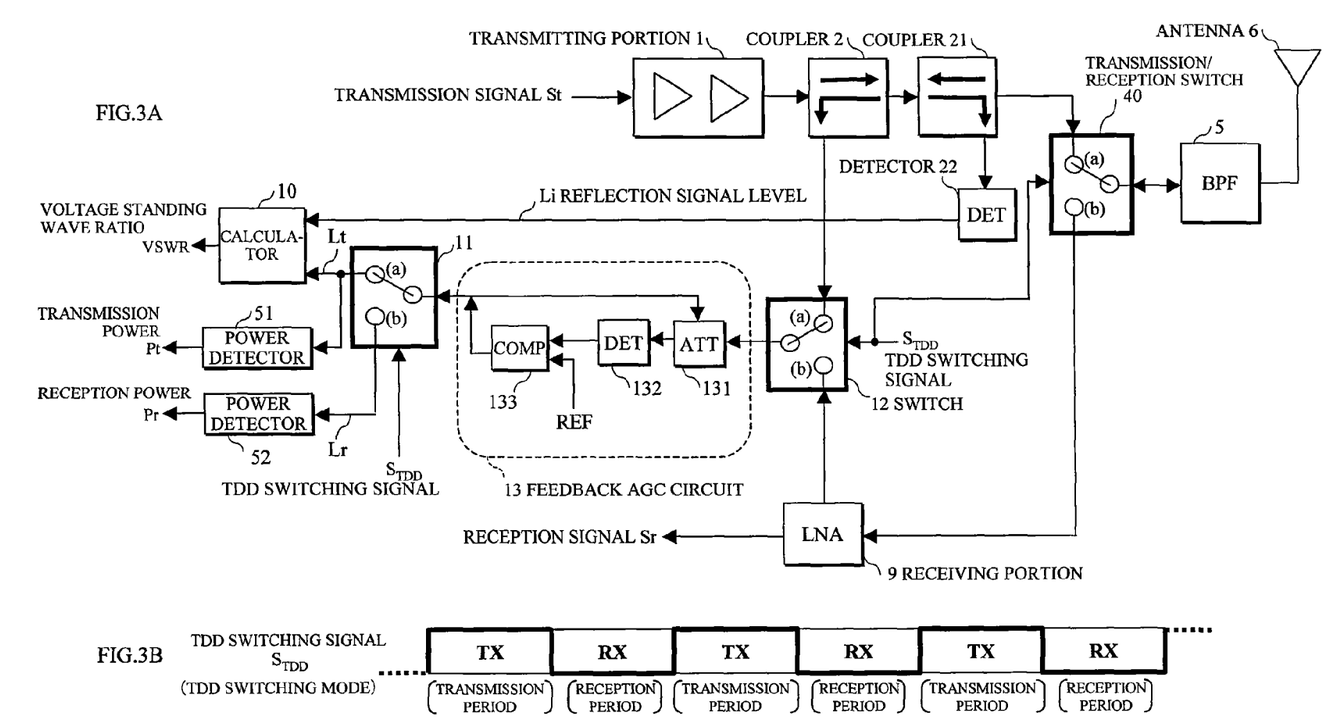
FIG. 3 is a diagram depicting an arrangement and a timing chart of an embodiment [3] of a wireless transmitting/receiving device.
Figure 3C:
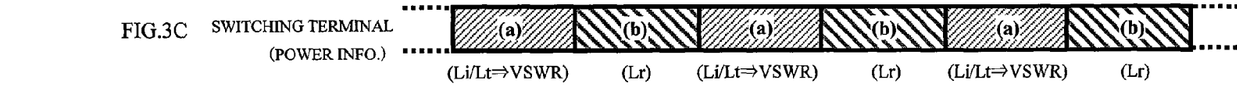

FIG. 3

This embodiment [3] depicted in FIG. 3 is different from the above embodiment [2] in that the transmission/reception switch 40 controlled by the TDD switching signal $S_{TDD}$ is substituted for the circulator 4 and that the couplers 2, 21 and the detector 22 are used for the transmitting side circuit in the same manner as FIG. 8 to detect the reflection signal level Li with the coupler 21 and the detector 22 to be provided to the calculator 10. Both embodiments are also different in that between the coupler 2 and the feedback AGC circuit 13 a switch 12 is used and between the feedback AGC circuit 13 and the calculator 10 the switch 11 is used, so that in the receiving side circuit no coupler and no detector are used, where the receiving signal from the transmission/reception switch 40 is connected to the switch 12 through the receiving portion 9.

The switch 12 is adapted to be controlled by the TDD switching signal $S_{TDD}$ synchronized with the TDD switching mode to perform a switchover between the coupler 2 and the receiving portion 9 to respectively provide the transmission signal and the reception signal to the feedback AGC circuit 13. Also the switch 11 having received the TDD switching signal $S_{TDD}$ is switched over to output the transmission signal level Lt or the reception signal level Lr provided by the feedback AGC circuit 13 in the same manner as the above embodiment [1]. Namely, the switches 11 and 12 are adapted to be jointly switched over from the terminal (a) to the terminal (b) by the TDD switching signal $S_{TDD}$.

In this embodiment, the transmission/reception switch 40 as well as the switches 11 and 12 are initially switched over to the terminal (a) as depicted, in synchronization with the transmission period TX in the TDD switching mode depicted in FIG. 3B. In this state, the transmission signal level Lt is provided from the coupler 2 through the switch 12 to the feedback AGC circuit 13 where the feedback distortion compensation is applied, and then provided to the calculator 10 through the switch 11.

In the transmission period TX, the reflection signal level Li is outputted to the detector 22 from the coupler 21 through the bandpass filter 5 and the transmission/reception switch 40 from the antenna 6 and then sent to the calculator 10 from the detector 22. Therefore, the calculator 10 can calculate the voltage standing wave ratio (VSWR) by using the transmission signal level Lt and the reflection signal level Li received in the transmission period TX.

On the other hand, when the TDD switching mode depicted in FIG. 3B enters the reception period RX, the transmission/reception switch 40 as well as the switches 11 and 12 are switched over to the terminal (b) by the TDD switching signal $S_{TDD}$ in synchronization with the TDD switching mode. Therefore, the reception power from the transmission/reception switch 40 is to be outputted through the receiving portion 9 as well as the switch 12, the feedback AGC circuit 13 and the switch 11.

Thus, in this embodiment the feedback AGC circuit 13 is applied for the detection of the transmission power in the transmission period TX and for the detection of the reception power in the reception period RX, enabling the operation rate of the detection circuit to be enhanced and the detection of the transmission signal level Lt, the VSWR and the reception signal level Lr to be realized with two pairs of the detection circuits.

Embodiment [4]

Figure 4:
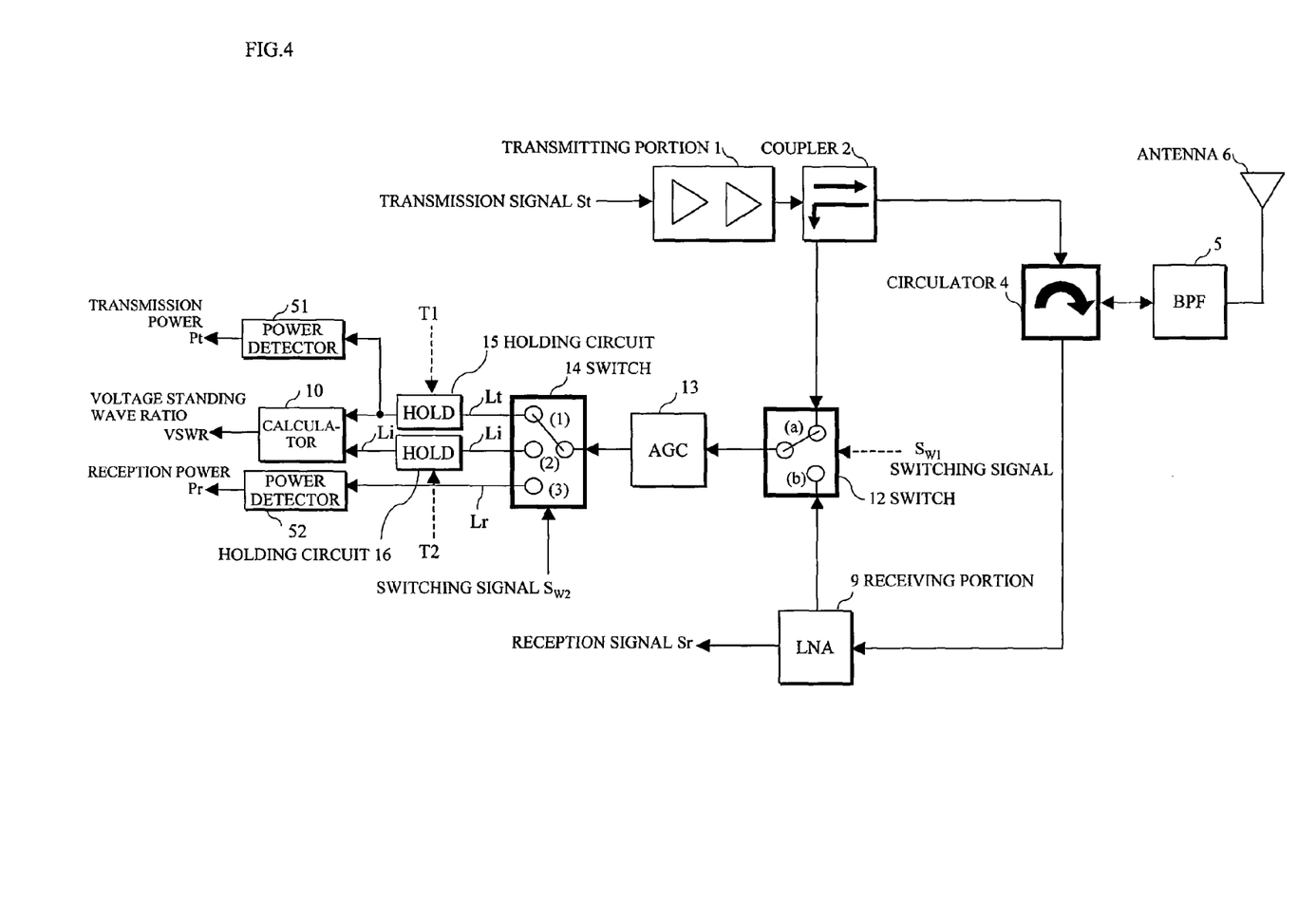
FIG. 4 is a block diagram depicting an arrangement of an embodiment [4] of a wireless transmitting/receiving device.

FIG. 4

This embodiment [4] depicted in FIG. 4 forms schematically a combination of the above embodiments [2] and [3].

Namely, the circulator 4 is used for connecting the transmitting side circuit and the receiving side circuit to the antenna 6 as with the embodiment [2] in FIG. 2, where the coupler 21 and the detector 22 used in the embodiment [3] in FIG. 3 are removed and between the feedback AGC circuit 13 and the calculator 10 a three-point switch 14 and two holding circuits 15, 16 are employed instead.

Figure 5A:
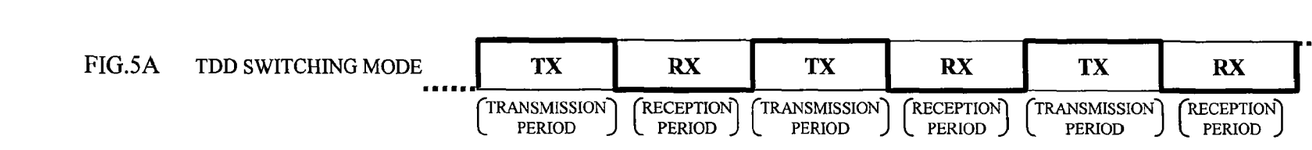
FIG. 5 is a diagram depicting a power detection timing example No. 1 of the embodiment [4] depicted in FIG. 4.
Figure 5B:
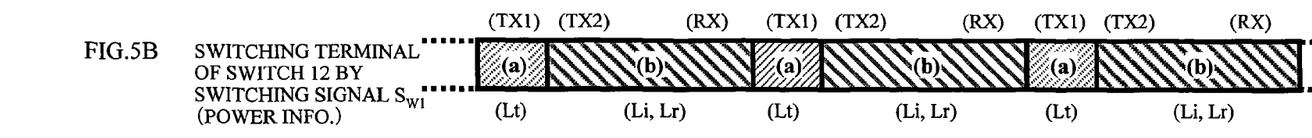
Figure 5C:
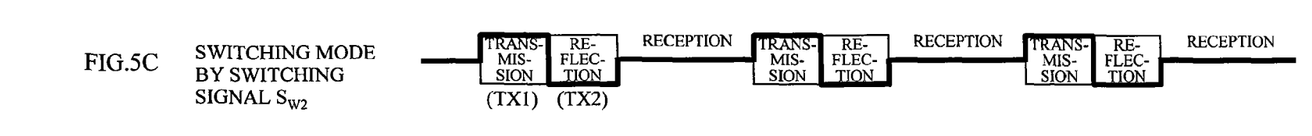
Figure 5D:
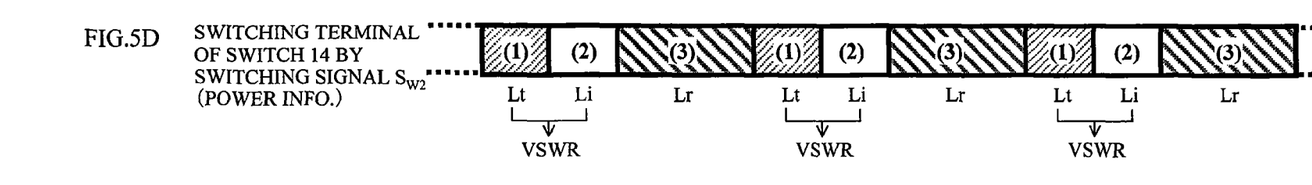

The switch 12 is switched over between the terminals (a)-(b) by a binary (1 bit) switching signal $S_{W1}$ as depicted in FIG. 5B, and the switch 14 is switched over between the terminals (1)-(2)-(3) by a ternary or three-valued (2 bits) switching signal $S_{W2}$ as depicted in FIG. 5D. As a result, the power measuring mode assumes "transmission", "reflection" and "reception" modes as depicted in FIG. 5C.

From the terminal (1) of the switch 14 the transmission signal level Lt is provided to the calculator 10 through the holding circuit 15, from the terminal (2) the reflection signal level Li is provided to the calculator 10 through the holding circuit 16 and from the terminal (3) the reception signal level Lr is provided to the power detector 52.

It is to be noted that the switch 12 in response to the binary switching signal $S_{W1}$ connects its terminal (a) to the coupler 2 in one part (TX1) of the transmission period TX while in the other part (TX2) of the transmission period TX the switch 12 connects its terminal (b) to the receiving portion 9. Also in the reception period RX the receiving portion 9 remains to be connected to the terminal (b).

Also in the switch 14, with the ternary switching signal $S_{W2}$, the feedback AGC circuit 13 is connected to the terminal (1) in the transmission period TX1, the feedback AGC circuit 13 is connected to the terminal (2) in the transmission period TX2 and the feedback AGC circuit 13 is connected to the terminal (3) in the reception period RX.

Thus in this embodiment, three kinds of detections, i.e. the detection of the transmission signal level (traveling wave level) Lt, the detection of the reflection signal level (reflection wave level) Li and the detection of the reception signal level Lr are made by the switch 14 through the feedback AGC circuit 13 from the switch 12.

Power Detection Timing Example No. 1

FIG. 5

In case of the TDD system, the transmission period and the reception period are separated and alternately allocated on a time access, where a period TX depicted in FIG. 5A forms the transmission period and a period RX forms the reception period. Considering the detection of the VSWR, because of this function being a monitoring function in the transmission period, the aforementioned transmission period TX is further divided into two periods TX1 and TX2 as depicted in FIG. 5C. Now assuming that the period TX1 be a transmission power detecting period and the period TX 2 be a reflection power detecting period, the relationship between the periods TX1, TX2, the reception period RX and switching states (terminals (1)-(3) of the switches 14) is as indicated in the following table:

TABLE 1

| PERIOD | SWITCHING STATE (TERMINAL OF SWICH 14☐ | SIGNAL MODE |
|---|---|---|
| TX1 | (1) | TRANSMISSION |
| TX2 | (2) | REFLECTION |
| RX | (3) | RECEPTION |

First, during the transmission period TX a signal from the coupler 2 is inputted to the feedback AGC circuit 13 in the transmission signal level detecting period TX1 (switching state (1)). Power information extracted from the feedback AGC circuit 13 is inputted to the holding circuit 15 by the switch 14, at which the value is held and provided to the calculator 10 as a detected value of the transmission signal level Lt, and is concurrently provided as a monitor output.

Then, in the reflection signal level detecting period TX2, a signal of the receiving portion 9 is inputted to the feedback AGC circuit 13 by the switch 12. A signal inputted to the receiving side circuit in the transmission period TX2 is a transmission wave reflected by the bandpass filter 5 and the antenna 6 due to mismatching and passed through the circulator 4, which is inputted to the holding circuit 16 through the switch 14 and provided to the calculator 10 as a detected value of the reflection wave signal level Pi. The detected values held by the holding circuits 15 and 16 are given to the calculator 10 to determine the power ratio and outputted as the VSWR to be monitored.

During the reception period RX, the reception wave passes through the circulator 4, so that the signal of the receiving portion 9 is inputted to the feedback AGC circuit 13 through the switch 12, which is outputted by the switch 14 to be monitored as a detection result of the reception signal level Lr.

The above noted power detection timings can be summarized as follows:
(1) Transmission Period TX1
The switch 12 is connected to the terminal (a) by the switching signal $S_{W1}$, in which the transmission signal level Lt is outputted from the feedback AGC circuit 13 through the terminal (a) from the coupler 2. The transmission signal level Lt is then held at the holding circuit 15 through the terminal (1) of the switch 14 in the transmission period TX1 as depicted in FIG. 5D.

(2) Transmission Period TX2
The switch 12 is switched over from the terminal (a) to the terminal (b) by the switching signal $S_{W1}$, whereby the reflection signal level Li in the transmission period TX2 is outputted from the feedback AGC circuit 13 through the circulator 4—the receiving portion 9—the terminal (b) of the switch 12. At this time, the switch 14 is switched over from the terminal (1) to the terminal (2) by the switching signal $S_{W2}$ as depicted in FIG. 5D, so that the reflection signal level Li is held at the holding circuit 16.

(3) Reception Period RX
While remaining to be connected to the terminal (b) by the switching signal $S_{W1}$, when the switch 12 transfers the reception signal from the receiving portion 9 to the feedback AGC circuit 13 from the terminal (b), the reception signal level Lr is outputted from the feedback AGC circuit 13. At this time, the switch 14 is switched over from the terminal (2) to the terminal (3) by the switching signal $S_{W2}$ as depicted in FIG. 5D, so that the reception signal level Lr is outputted from the terminal (3).

Then by reading out the transmission signal level Lt and the reflection signal level Li respectively held at the holding circuits 15 and 16 at timings T1 and T2 depicted in FIG. 4, the calculator 10 having received them calculates the VSWR, where the reading timings T1 and T2 of the holding circuits 15 and 16 may be made concurrent or different.

It is to be noted that the transmission period TX1 and the reflection period TX2 may be ½ of the transmission period TX as depicted in FIG. 5C or allocated for respective specified time durations.

Normally, transmission/reception switchover timings in the TDD system may be made variable in order to flexibly keep the capacity variability which is a merit of the TDD system. For example in a WiMAX system, the transmission timing is made variable between 50%-75%. Also, the frame length has a prescribed value of 5 ms, so that the transmission signal level detecting period TX1 may be fixed to 1.25 ms and the remaining period may be allocated for the reflection signal level detecting period TX2. In this case, the reflection signal level detecting period TX2 assumes 1.25 ms-2.5 ms depending on the transmission/reception ratio.

Power Detection Timing Example No. 2

Figures 6A, 6B:
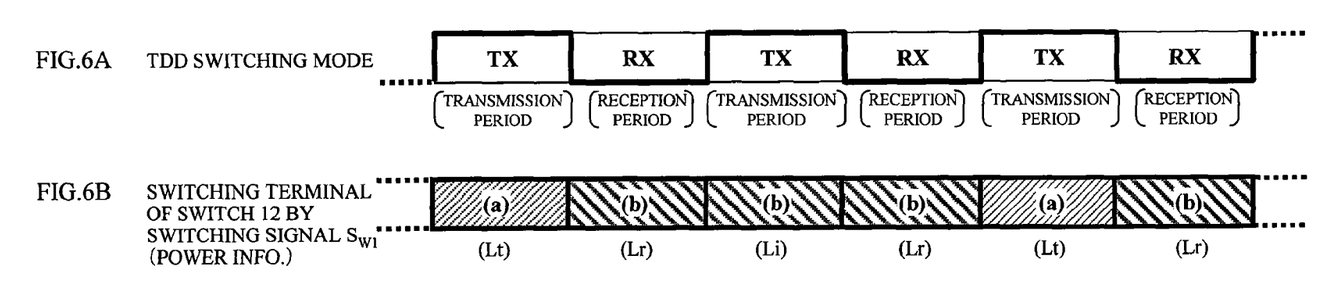
FIG. 6 is a diagram depicting a power detection timing example No. 2 of the embodiment [4] depicted in FIG. 4.
Figure 6C:
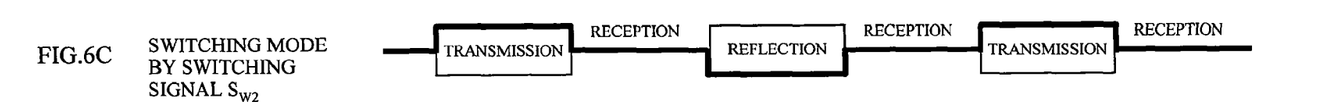
Figure 6D:
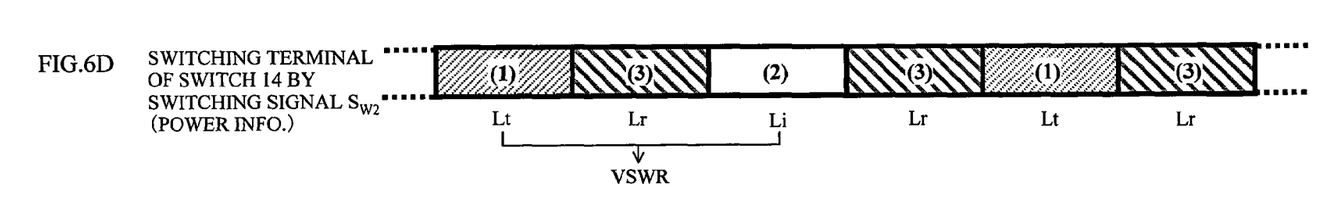

FIG. 6

In the detection timing example depicted in FIGS. 5A-5D, the transmission period TX within a single frame is divided into two parts for the transmission signal level detecting period TX1 and the reflection signal level detecting period TX2, which may alternate with the reception period RX as depicted in FIG. 6C.

Namely, after the switch 12 has been switched over from the terminal (a) to the terminal (b) by the switching signal $S_{W1}$ as depicted in FIG. 6B, the position of the terminal (b) is maintained still in the next transmission period TX and the switch 12 is returned to the terminal (a) in the further next transmission period TX. Therefore, the control of the switch 14 by the switching signal $S_{W2}$ has the order of the terminals (1)-(3)-(2)-(3), whereby the timing control for dividing the transmission period TX at the time of detecting the VSWR becomes unnecessary while the holding time at the holding circuit 15 is extended, so that the TDD timing can be applied to the switchover state timings without changes.

Power Detection Timing Example No. 3

FIG. 7

Figure 7A:
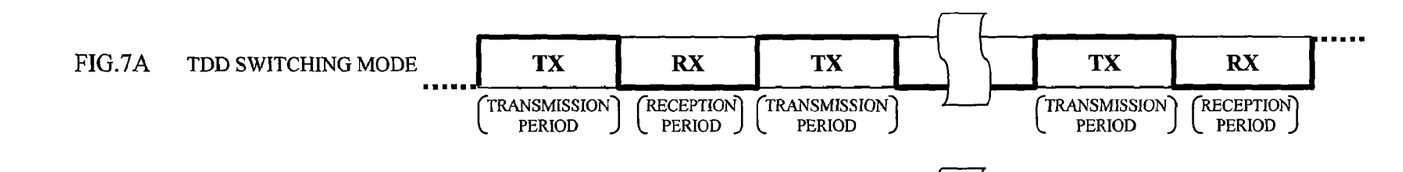
FIG. 7 is a diagram depicting a power detection timing example No. 3 of the embodiment [4] depicted in FIG. 4.
Figure 7B:
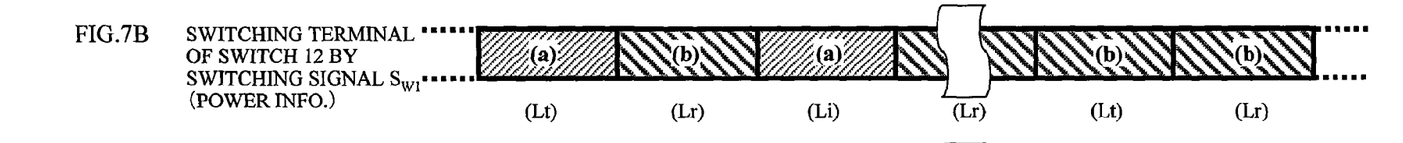
Figure 7C:
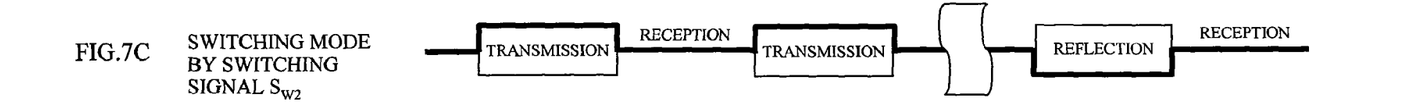
Figure 7D:
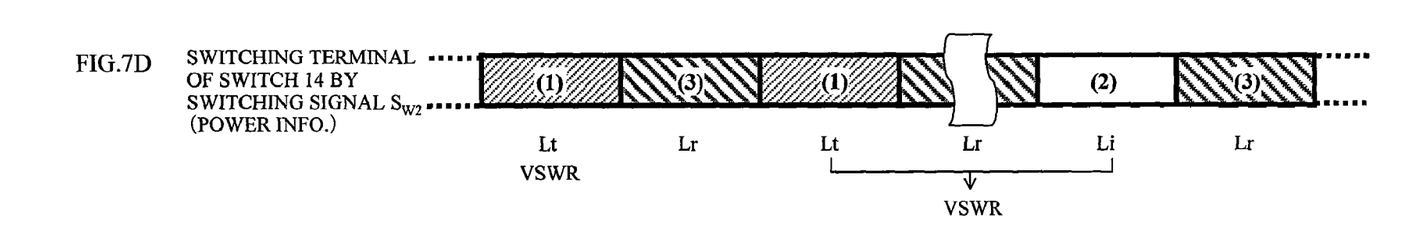

While in the power detection timing example depicted in FIG. 6 the allocation of the transmission power detecting period and the reflection power detecting period is alternated per frame, a plurality of frames may be repeatedly used as depicted in FIG. 7C. In this case, the holding time at the holding circuit 15 is to be further extended, whereas the VSWR detecting process can be made at a low speed, achieving a low speed operation.

In such an arrangement, the holding time itself does not become a problem if a digital formed register is used for the holding circuits 15 and 16, where the reduction of the processing speed is contradictory to the updating time of the detected values, so that the number of frames required is determined by a tradeoff between them.

Also, for determining the number of frames required, from another view point it is necessary to consider the precision maintaining time for the feedback type distortion compensation. In either of the above examples, the transmission period is allocated in the transmission signal (traveling wave) level detecting period and the reflection signal level detecting period. Therefore, the feedback type distortion compensation is only operated in the transmission signal level detecting period, resulting in a free run control of open loop in the reflection signal level detecting period.

However in case of the TDD system, 25%-50% of the entire operating time originally include the reception period, so that the feedback AGC circuit 13 itself for distortion compensation is adapted to apply thereto a holdover of loop parameter so as not to be diverged even in such an open loop and the convergence is enabled even under intermittent operations. Therefore, the extension of a convergence time due to a ratio between the transmission signal level detecting periods enabling the feedback operation being relatively decreased and the followability to the characteristic variation may be evaluated.

It is conceived that while the frame length used in WiMAX is 5 ms as described above, a dominant item as a characteristic variation element is a thermal variation, which presents a very slow variable characteristic in comparison with the frame length. In consideration of the application for the monitoring update intervals as well, it is conceived that there is no case of requiring detected values corresponding to the frames, where there may be a time precision for every second update While the above objective items are the transmission signal level Lt, the VSWR and the reception signal level Lr, burst detections are not required because the transmission signal level Lt and the reception signal level Lr depend on traffic conditions so that an averaged value at test times or the like is required. Also, the VSWR is continuously detected in the actual operation, where monitoring a time degradation such as impedance matching degradation due to water proof defect is a main object which is also an averaged or statistic item to be monitored.

According to the above described embodiments, it is possible to decrease the number of directional couplers and detectors, to enhance the operating rate of the circuits having been previously used only for the transmission period or reception period and to realize the detection of the transmission power, the VSWR and the reception power with the minimum circuit scale, thereby largely contributing to performance improvements of a TDD transmitting/receiving duplexer.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A wireless transmitting/receiving device comprising:
a coupler to provide a transmission signal to an antenna side and to provide a signal from the antenna side to a receiving side; and
a first detecting portion to detect a level of the transmission signal in a transmission period of the transmission signal on a transmitting side,
a second detecting portion to switch over between detecting a level of a reflection signal of the transmission signal received through the coupler from the antenna side in the transmission period of the transmission signal on the receiving side and detecting a level of a reception signal from the antenna side through the coupler in a reception period on the receiving side, wherein
the level of the reflection signal detected by the second detecting portion and the level of the transmission signal detected by the first detecting portion are used for calculating VSWR (Voltage Standing Wave Ratio).

2. The wireless transmitting/receiving device as claimed in claim 1, wherein the first detecting portion detects the level of the transmission signal before inputted to the coupler.

3. The wireless transmitting/receiving device as claimed in claim 1, wherein the second detecting portion detects the level of the reflection signal in one part of the transmission period and detects the level of the transmission signal in another part of the transmission period.

4. The wireless transmitting/receiving device as claimed in claim 1, wherein the coupler comprises a circulator.

5. The wireless transmitting/receiving device as claimed in claim 1, further comprising a calculator to calculate a standing wave ratio from the transmission signal and the reflection signal.

6. The wireless transmitting/receiving device as claimed in claim 1, wherein a part of the transmission period comprises a part of one transmission period and the remaining part of the transmission period comprises the remaining part of the one transmission period.

7. The wireless transmitting/receiving device as claimed in claim 1, wherein a part of the transmission period comprises a part of overall transmission periods and the remaining part of the transmission period comprises the remaining part of the overall transmission periods.

8. A wireless transmitting/receiving device comprising:
a first selecting portion to select a transmission signal to an antenna or a reception signal from the antenna;
a detecting portion to detect a level of the transmission signal in a transmission period of the transmission signal on a transmitting side and to detect a level of a reflection signal of the transmission signal from the antenna on the transmitting side in the transmission period; and a second selecting portion to switch over between selecting the transmission signal in the transmission period and selecting a reception signal detected on a receiving side in a reception period, wherein the level of the reflection signal detected by the detecting portion and the level of the transmission signal detected by the detecting portion and selected by the second selecting portion are used for calculating VSWR.

9. The wireless transmitting/receiving device as claimed in claim 8, wherein the first selecting portion comprises a two-point transmitting/receiving switch, the detecting portion comprises a coupler and a detector and the second selecting portion comprises a two-point switch and a feedback AGC circuit.

10. The wireless transmitting/receiving device as claimed in claim 8, further comprising a third selecting portion to select the transmission signal or the reception signal both from the second selecting portion respectively in the transmission period and the reception period.

* * * * *